April 25, 1950 N. H. SHILLMAN 2,505,653
TAPE CASING
Filed Sept. 10, 1947
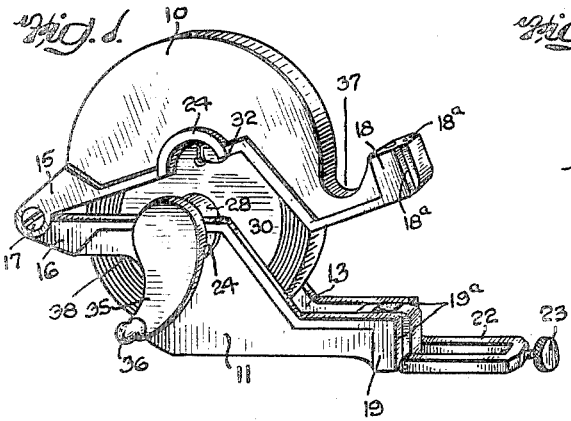
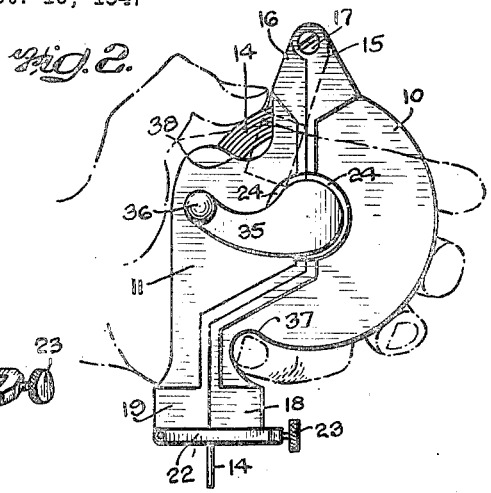
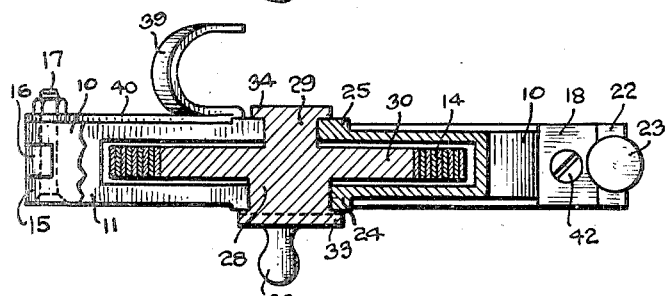
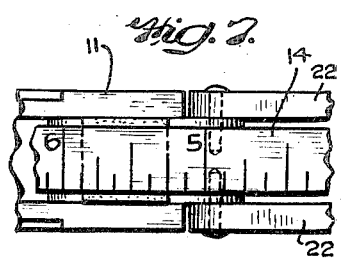
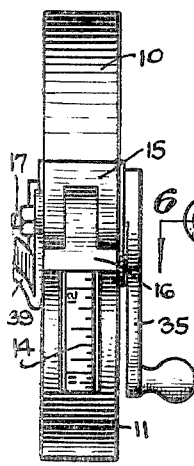
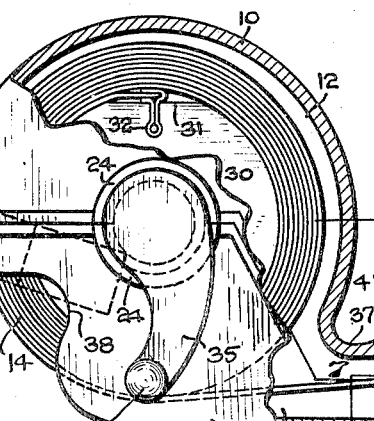
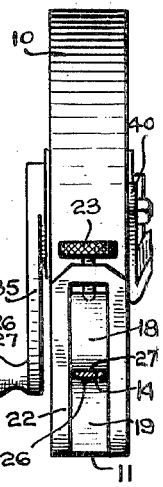
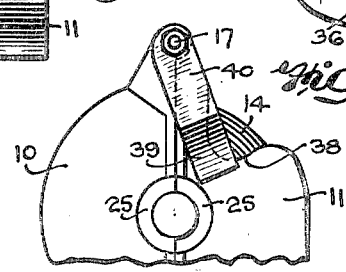
INVENTOR.
NATHAN H. SHILLMAN
BY Leon Edelson
ATTORNEY Patented Apr. 25, 1950

2,505,653

UNITED STATES PATENT OFFICE 2,505,653

TAPE CASING

Nathan H. Shillman, Baltimore, Md.

Application September 10, 1947, Serial No. 773,132

9 Claims. (Cl. 242—84.8)

1

This invention relates to casings for measuring tapes and more particularly to casings for use in connection with that type of thin steel graduated tape which is wound upon a drum revoluble in the casing and which is used for sounding the depth of tanks, wells and the like containing oil or similar liquids and for general use in the field, such casings being shown and described in my prior United States Letters Patent Nos. 1,485,634 and 1,679,178.

In tape casings of the type shown in my prior patents, aforesaid, drawn from and retracted into the casing through an opening or slot formed in or adjacent to the peripheral wall of the casing, the tape opening being of a width sufficient to accommodate the tape and having associated therewith wiper elements which engage opposite faces of the tape as it travels through the opening to clean the tape of accumulated dirt, grease, oil or like extraneous matter. These wiper elements are generally provided, for best action, with opposed flat surfaces of substantial area, thus requiring the tape to travel rectilinearly therebetween. When the tape opening is disposed with the meeting plane of the wiper elements extending radially of the tape casing, as when said plane is coincident with a diametric plane of the casing, the tape, as it is drawn from or wound upon its revoluble drum, must necessarily bend or flex sharply within the casing immediately to the rear of the wiper elements due to the fact that the portion of the tape extending from the tape outer circle to the wiper elements forms a relatively sharp angle with the portion of the tape traversing said wiper elements. This constant bending or flexing of the tape in the region between the wiper elements and the tape drum interferes with free withdrawal or retraction of the tape during use thereof.

Having in mind the foregoing, it is among the principal objects of the present invention to provide a casing for a tape wound upon a revoluble drum wherein the tape opening or slot is positionally offset from the diametric plane of the casing so that the opposed wiper elements associated with said opening or slot provide therebetween a rectilinear path of travel for the tape which is substantially tangential to the outer circle of the tape wound upon its supporting drum, thereby eliminating to large extent, if not entirely, the undesired sharp flexing or bending of the tape.

Still another and important object of the present invention is to provide a two-part casing for a tape wound upon a drum rotatable within the casing wherein the tape opening aforesaid and

2 wiper elements associated therewith are conveniently arranged within complementally formed portions of the tape casing extending substantially tangential to the outer peripheral edge of the main body portions of the casing, this construction being of particular significance in that it provides for convenient holding of the casing within the palm of the hand of the user with the thumb and fingers thereof overlying the periphery of the casing, thus eliminating the necessity of providing the casing with a supporting handle.

A still further object of the present invention is to provide a casing of the character aforesaid wherein the peripheral edge thereof is provided with a conveniently located cut-out opening for exposing a portion of the outer circle of the tape to pressure of the thumb for braking the movement of the tape as it is withdrawn from the casing, such thumb braking being conveniently applicable to instantaneously stop the tape at any point or to reduce its speed of travel from the casing.

Other objects and advantages of the present invention will appear more fully hereinafter, it being understood that said invention consists substantially in the combination, construction, location and relative arrangement of parts, all as will be described in detail hereinafter, as shown in the accompanying drawings and as finally pointed out in the appended claims.

In the said accompanying drawings:

Figure 1 is a perspective view showing the casing parts in separated relation to expose partially the internal drum and the tape wound thereon;

Figure 2 is a side elevational view of the casing in closed operative condition, showing the manner of supporting the same in the hand of the user;

Figure 3 is a view, partly in side elevation and partly in vertical section, showing details of construction of the casing;

Figure 4 is a front elevational view of the casing;

Figure 5 is a rear elevational view thereof;

Figure 6 is a transverse sectional view taken on the line 6—6 of Figure 3;

Figure 7 is a partial view of a portion of the casing as taken on the line 7—7 of Figure 3; and Figure 8 is a partial elevational view of that side of the casing opposite that shown in Figure 2.

The same part is designated by the same reference numeral whenever it occurs throughout the several views.

A characteristic feature of the tape casing of the present invention is that it is so constructed as to be comfortably held within the hand of a user thereof, preferably, but not necessarily, the left hand, with the tape opening end of the casing pointing downwardly, the shape of the casing being such that it fits comfortably within the palm of the hand with the thumb and fingers thereof gripping the outer peripheral face thereof. At the place where the thumb would normally rest, the periphery and part of the side walls of the casing are cut away to expose the tape therein, so that the thumb may engage and exert a braking force thereon whenever the same is desired. The casing is generally constructed of two complementally shaped members which are closed along angularly related lines to form the whole, this being effected by hinging the two members together at the rear end and by the provision of a yoke and set screw locking device at the other or front end of the casing, the construction being such that the casing can readily be opened or closed and the component parts easily taken apart and then reassembled with simple tools, such as a screw driver, or the like. The casing has a central opening forming two bearings of unequal diameters in which is seated the rotary crank element and the winding drum with the tape thereon.

A stuffing box is provided at the entrance end of the casing having means to wipe the tape as it is wound upon or withdrawn from the tape drum revoluble within the interlocked casing members. The yoke, which serves to releasably interlock the front ends of the casing members, serves also as a guide for the tape to prevent lateral displacement thereof from its proper line of travel between the wiper elements, thus preventing undesired and unintentional binding of the tape between the juxtaposed edges of the casing members.

Referring now more specifically to the drawings, it will be seen that the casing consists primarily of two members indicated generally by the reference characters 10 and 11. These members 10 and 11 are each partially of generally circular outline having hollow interiors 12 and 13 such that when assembled together with their complementally formed edges in engagement with each other a closed casing substantially circular for most of the periphery thereof is provided in the interior of which may be accommodated the measuring tape 14.

At the rear end of the members 10 and 11 are provided dovetailed hinge pin bosses 15 and 16, respectively, through which extends a hinge pin 17, thus providing a hinged joint at this rear end of the casing. The members 10 and 11 are of unequal circumferential extent, the former extending beyond and the latter receding from semi-circular sections by approximately forty-five degrees at the front or tape opening end of the casing to provide an offset tangential extension comprising the portions 18 and 19 integrally formed with the members 10 and 11, respectively, and projecting therefrom at the forward ends thereof. Thus, the front end of the casing, formed by the projections 18 and 19, extends along a median line which is substantially tangential to the outer circle of the tape on the drum. The projections 18 and 19 are provided with recesses 20 and 21, respectively, for a purpose to be described.

Hinged to one of the casing members, preferably to the member 11, at the extreme forward offset end 19, is a pivoted yoke 22 of generally U-shape, the legs and base of the U-shape being adapted when swung from the position of Figure 1 to that of Figure 8. to embrace the offset ends 18 and 19 within the undercut side portions 18ª and 19ª thereof to be flush with the bottom, sides and front end of the casing, as clearly appears in Figures 3 and 6. By means of the set screw 23 passing through the base of the yoke 22 and engaging the upper surface of the forward end 18, the members 10 and 11 are releasably locked firmly into closed position, in the manner shown in Figure 3.

The casing members 10 and 11 are respectively provided with enlarged semi-circular bosses 24—24 and 25—25 which, when the members are locked together, constitute circular bearings on the opposite sides of the casing in which are respectively seated the opposite ends of the journal of the winding drum, which will be described later. In this particular instance, the bearing 24 is of greater diameter than the bearing 25, though for the purposes of this invention these bearings could well be of equal diameter. As is best apparent in Figures 3 and 4, the front ends 18 and 19 of the casing members 10 and 11 are complementally formed along their opposed faces to conjointly form a slot 26 having a slightly flared opening 27 providing for easier travel of the tape into and out of the casing. It will be noted that the side arms of the yoke 22 are disposed to either side of the slot 26 and so embrace the juxtaposed ends 18 and 19 of the casing as to provide an adequate guide for the tape to limit side movement thereof and thus confine the tape to rectilinear travel only between the wiper elements of the casing.

The rotary crank unit which is preferably a part of the winding drum consists essentially of a large journal 28 formed integrally with a smaller journal 29, these journals being adapted to fit respectively in the bearings 24 and 25 in the casing. Formed intermediately of journals 28 and 29 is an enlarged circular central portion 30 which is the drum upon which the tape is wound, said drum 30 having a flattened portion 31 in its peripheral edge in which is cut a transverse slot terminating in a circular opening 32, the inner end of tape 14 being suitably provided with means adapted to fit within said slot and opening 32 to anchor the same to said drum.

To prevent lateral displacement of the drum and crank unit with respect to the casing, integrally formed flanges 33 and 34 are provided at the opposite ends thereof, these flanges embracing the exterior surfaces of the bearings 24 and 25, respectively, when the crank unit is positioned within the casing. Preferably formed integrally with the flange 33 is a radially extending curved extension 35 which serves as the crank arm for the drum 30, said arm being provided with a handle 36 by means of which the drum may be rotated. It will be noted that the length of the crank arm is less than the radius of the circular portion of the casing so that as the crank 35 is rotated with one hand of the user of the tape, it will not strike or otherwise be interfered with by the fingers of the other hand in which the casing is held.

As most clearly appears in Figure 2, the casing is well adapted to be held in the palm of the left hand with the fingers and thumb thereof extending about the peripheral edge of the case to provide a firm and convenient grip thereon. In order to accommodate the little finger of the hand, the casing is provided with a reentrant recess 37 located between the forward end of the circular portion of the casing and its tangential offset portion 18. The size and shape of the circular body portion of the casing are generally such as to permit the remaining fingers to fit over and firmly grip the peripheral edge of said body portion, while the thumb of the user's hand engages the exposed tape on the drum through a cut-out opening 38 provided in the hinged casing member 11 immediately adjoining its rear hinged end. By varying the pressure of the thumb upon the tape as it is being unwound from its drum, a satisfactory braking action is obtained for controlling the travel of the tape from the casing.

An additional support for the hand is provided on the casing in the form of a U-shaped member 39 at the end of strap 40 which is mounted directly upon the hinge pin 17, the U-shaped member fitting over the upper edge of the hand, as shown in Figure 2. It will be obvious that the member 39 may be made an integral part of the casing member 10, or, if desired, it may be dispensed with entirely.

The stuffing box is formed integrally at the entrance end of the casing by the provision of oppositely disposed sockets 20 and 21 in each of which is disposed a wiper element 41. These wiper elements are preferably formed of a suitable non-abrasive material and are arranged by any suitable method to fit snugly within their respective sockets 20 and 21. Set screws 42—42 passing through the base walls of the sockets from the exterior surfaces of the offset extensions 18 and 19 of the casing provide a suitable means for adjustably projecting the wiper elements outwardly from their sockets toward each other into wiping engagement with the opposite surfaces of the tape as the latter passes therebetween into the casing through the entrance opening slot 26 to be wound upon the drum. When the tape is not in use, the wiper elements, due to the pressure exerted upon the tape, act as a brake thereon, thus preventing any unintended unwinding of the tape, the wiping pressure of these elements upon the tape passing therebetween being adjusted as desired by tightening or loosening the bearing of the set screw 23 against the member 18 when the yoke 22 is in its locking position.

It will be noted, as particularly seen in Figures 2 and 3, that the offset entrance end portion of the casing is substantially tangent to the circular body portion thereof and that consequently the tape travels between the wiping blocks 18 and 19 along a rectilinear line which extends substantially tangent to the outer circle of tape on the winding drum. Of course, the diameter of the wound tape on the drum varies in accordance with the amount of tape thereon with a consequent shifting of the line of travel of the tape, but with the construction shown, the tape, nevertheless, travels along a line which provides for a minimum bending or flexing thereof.

It is customary with this type of tape to use a plumb bob on the end thereof for withdrawing the tape from the casing. In such case, the speed of travel of the tape from the casing may be regulated by means of a braking action applied thereto by the wiping blocks and by the thumb of the hand holding the casing.

It is understood that various arrangements and modifications other than that described above may be devised, and yet come within the spirit of this invention. Accordingly, it is the intention that the appended claims be construed broadly to cover such alternative arrangements and modifications.

What is claimed as new and useful is:

1. A tape casing comprising a pair of pivotally connected complementally shaped members adapted when juxtaposed along their meeting edges to form a tape housing having a circular shaped portion enclosed on its opposite sides by parallel side walls, the meeting edges of said members being along a line extending radially from their pivotal connection through the center of said circular shaped portion and thence along a line forming an angle with said first-mentioned line, said members being respectively provided at their outer separable ends with integral extensions, the edges of which are adapted for juxtaposition into abutting relation along a plane extending through the terminal end of said last-mentioned line and substantially tangential to the outer circle of a tape wound within said casing.

2. A tape casing comprising a pair of pivotally connected complementally - shaped members adapted to form a tape housing having a circular shaped main body portion and a supplemental coplanar portion extending outwardly of said main body portion, said main body and supplemental portions being enclosed on their opposite sides by substantially parallel side walls, the inner edges of which are adapted to be presented in abutting relation along a line one segment of which extends from the pivotal connection of said members radially through the center of said circular main body portion, a second segment of which extends at an angle to said first line segment and a third segment of which extends from the terminal end of said second line segment in a direction substantially tangential to and outwardly of said circular main body portion.

3. A tape holding casing comprising a substantially circular main body portion having an offset portion extending substantially tangential to and outwardly of said main body portion, said casing being formed of a pair of pivotally connected complementally shaped members adapted to be juxtaposed with the meeting edges of said main body portion separable along a pair of lines forming an angle therebetween, one of which extends radially through said pivotal connection, and with the meeting edges of said offset portion separable along a line offset from and paralleling the radial line extending through said pivotal connection.

4. A tape holding device comprising a pair of pivotally connected complementally formed members adapted when juxtaposed to form a tape housing having a substantially circular main body portion and substantially parallel side enclosing walls, the free ends of said members being respectively provided with coplanar extensions conjointly forming a passageway for travel of the tape into and out of the tape housing, and a yoke pivotally connected to the free end extension of one of said members and adapted to commonly embrace both of said free end extensions to lock the same together, said extensions being vertically rabbeted to receive said yoke whereby to constitute the latter a guide for precluding lateral displacement of the tape as it traverses said passageway.

5. A tape holding casing comprising a substantially circular portion adapted to form a housing for a drum with a tape wound thereon and an offset portion substantially tangent to said circular portion and extending therefrom to form an entrance end for said tape, said casing being adapted to be held within the palm of the hand of a user thereof with said entrance end pointing downwardly, a notch formed between said circular and said offset portions within which the little finger of the hand is adapted to be placed, the remaining fingers and the thumb being adapted to overlie the casing periphery, said casing having an opening therein exposing said tape drum at a point where said thumb would normally be placed, whereby said thumb may engage said tape, a member projecting from one side of the casing against which the upper edge of the hand is adapted to be placed and a crank arm secured to said drum for rotating the same.

6. A tape casing comprising a pair of complementally formed members adapted when fitted together to form a casing for a tape, wound upon a drum, said members being hinged together at their rear ends, a yoke pivotally connected to the free end of one of said members and adapted to embrace the corresponding free end of said other member to releasably interlock said members in closed juxtaposed condition, the interior side walls of said yoke being adapted to serve as guides for said tape to insure travel thereof rectilinearly in the plane of the tape wound up upon the drum.

7. A tape casing comprising a pair of complementally formed members adapted when fitted together to form a casing for a revoluble tape reel assembly, said casing having an opening for withdrawal of the tape therefrom, the rear ends of said members being hinged together, wiping elements disposed within the opposed free ends of said members upon opposite sides of said tape opening, and a yoke pivotally connected to the free end of one of said members and adapted to embrace the free end of said other member to releasably interlock the same together, said yoke embracing the line of meeting of said members and having an opening the width of which is substantially equal to the width of said wiper elements measured transversely thereof.

8. A tape casing comprising a pair of complementally formed members adapted when fitted together to form a casing for a revoluble tape reel assembly, said casing having an opening for withdrawal of the tape therefrom, wiping elements respectively disposed within the opposed free ends of said members, and a yoke pivotally connected to a reduced section of one of said members and adapted to embrace a like reduced section on the free end of said other member to releasably interlock the same together, said yoke embracing the line of meeting of said members and having an opening the width of which is substantially equal to the width of said wiper elements measured transversely thereof, the opposite sides of said yoke being adapted to serve as guides for said tape to maintain the same in line with said tape opening and between said wiper elements, the exterior walls of said yoke being flush with the side, end and bottom surfaces of said casing.

9. A tape holding device comprising a pair of pivotally connected complementally-shaped main body members each having an offset portion, said members being adapted for juxtaposition with their meeting edges separable along a pair of lines forming an angle therebetween, one of which extends radially through said pivotal connection, and with the meeting edges of said offset portions separable along a line offset from and paralleling the radial line extending through said pivotal connection.

NATHAN H. SHILLMAN.

REFERENCES CITED

The following references are of record in the file of this patent:

UNITED STATES PATENTS

| Number | Name | Date |
|---|---|---|
| 983,013 | Wright | Jan. 31, 1911 |
| 1,679,178 | Shillman | July 31, 1928 |
| 1,821,735 | Wharton | Sept. 1, 1931 |
| 2,106,053 | Laingor | Jan. 18, 1938 |
| 2,167,908 | Richards | Aug. 1, 1939 |